United States Patent
Coggin et al.

(10) Patent No.: US 12,429,904 B2
(45) Date of Patent: *Sep. 30, 2025

(54) HETEROGENEOUS COMPUTING SYSTEMS AND METHODS FOR CLOCK SYNCHRONIZATION

(71) Applicant: SYNG, Inc., Marina del Rey, CA (US)

(72) Inventors: Jay Sterling Coggin, Brooklyn, NY (US); Marc Carino, Venice, CA (US); Fabian Renn-Giles, West Drayton (GB); Mark Rakes, Venice, CA (US); Afrooz Family, Los Angeles, CA (US)

(73) Assignee: SYNG, Inc., Marina del Rey, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/522,071

(22) Filed: Nov. 28, 2023

(65) Prior Publication Data

US 2024/0353889 A1    Oct. 24, 2024

Related U.S. Application Data

(63) Continuation of application No. 17/457,637, filed on Dec. 3, 2021, now Pat. No. 11,868,175.

(60) Provisional application No. 63/121,147, filed on Dec. 3, 2020.

(51) Int. Cl.
G06F 1/12    (2006.01)
(52) U.S. Cl.
CPC .................................. G06F 1/12 (2013.01)
(58) Field of Classification Search
CPC ....................................................... G06F 1/12
See application file for complete search history.

(56) References Cited

U.S. PATENT DOCUMENTS

2013/0125118 A1    5/2013    Niesser et al.

FOREIGN PATENT DOCUMENTS

| CN | 111726185 A | 9/2020 |
|---|---|---|
| KR | 101894901 B1 | 10/2018 |

OTHER PUBLICATIONS

Extended European Search Report for European Application No. 21901665.6, Search completed Sep. 23, 2024, Mailed Oct. 1, 2024, 09 Pgs.

*Primary Examiner* — Stefan Stoynov
(74) *Attorney, Agent, or Firm* — KPPB LLP

(57) ABSTRACT

Systems and methods for clock synchronization in accordance with embodiments of the invention are illustrated. One embodiment includes a clock synchronization system includes a reference device including a clock circuitry, and a transmitter configured to transmit a synchronization signal based on a clock signal using the clock circuitry, and a receiving device including a processor configured to operate by a general-purpose operating system (GPOS), a coprocessor configured to operate by a real-time operating system (RTOS), a memory utilized by the processor, where the coprocessor has direct memory access to the memory, and a receiver configured to receive the signal, where the RTOS directs the coprocessor to trigger an interrupt upon reception of the signal, sample a GPOS clock time stored in the memory in response to the interrupt, generate a clock time based on the signal and the sampled GPOS clock time, and provide the GPOS with the clock time.

20 Claims, 12 Drawing Sheets

HETEROGENEOUS COMPUTING SYSTEMS AND METHODS FOR CLOCK SYNCHRONIZATION

CROSS-REFERENCE TO RELATED APPLICATIONS

The current application is a continuation of U.S. patent application Ser. No. 17/457,637 entitled "Heterogeneous Computing Systems and Methods for Clock Synchronization" filed Dec. 3, 2021 which claims the benefit of and priority under 35 U.S.C. § 119 (e) to U.S. Provisional Patent Application No. 63/121,147 entitled "Heterogeneous Computing Systems and Methods for Clock Synchronization" filed Dec. 3, 2020. The disclosures of which are hereby incorporated by reference in their entirety.

FIELD OF THE INVENTION

The present invention generally relates to clock synchronization in computing systems and, more specifically, to synchronizing audio playback across multiple network connected loudspeakers.

BACKGROUND

Computing devices often have internal clocks for timekeeping. However, due to many variables from manufacture to environment, independent clocks may run at different rates than a reference clock. This phenomenon is called "clock drift." Crystal-based clocks often used in computing devices experience are often impacted by clock drift. Furthermore, distributed and/or computing devices may also suffer from "clock skew," where the same sourced clock signal arrives at different components at different times, adding inaccuracy to the believed time at the destination device.

Operating systems (OSs) are system software that manages device hardware, software resources, and provides common services for computer programs, such as scheduling. "Normal" OSs such as, but not limited to (Windows, macOS, iOS, Linux, and UNIX) are often referred to as general purpose OSs (GPOSs). In contrast, a type of OS referred to as a real-time OS (RTOS) are specifically designed to serve real-time applications that process data as it is received. GPOS and RTOS differ in several ways, including their scheduling systems.

Heterogeneous computing systems refer to systems that use more than one type of processor or cores. For example, a heterogeneous computing system may include a processor and a coprocessor.

SUMMARY OF THE INVENTION

Systems and methods for clock synchronization in accordance with embodiments of the invention are illustrated. One embodiment includes a heterogeneous clock synchronization system includes a reference device including a clock circuitry, and a transmitter, where the transmitter is configured to transmit a synchronization signal based on a clock signal generated by the clock circuitry, and at least one receiving device includes a processor, configured to operate by a general-purpose operating system (GPOS), a coprocessor, configured to operate by a real-time operating system (RTOS), a memory utilized by the processor, where the coprocessor has direct memory access to the memory, and a receiver, configured to receive the synchronization signal, where the RTOS directs the coprocessor to trigger an interrupt upon reception of the synchronization signal, sample a GPOS clock time stored in the memory in response to the interrupt, generate a synchronized clock time based on the synchronization signal and the sampled GPOS clock time, and provide the GPOS with the synchronized clock time.

In another embodiment, the processor and coprocessor are unique cores of a multicore processor.

In a further embodiment, the GPOS configures the processor to playback audio based on the synchronized clock time using a loudspeaker operatively connected to the receiving device.

In still another embodiment, the audio playback by the receiving device is synchronized with audio playback by the reference device.

In a still further embodiment, the RTOS provides the GPOS with the synchronized clock time using a mailbox mechanism.

In yet another embodiment, the reference device includes a primary loudspeaker, and the at least one receiving device includes a plurality of secondary loudspeakers.

In a yet further embodiment, the primary loudspeaker and the plurality of secondary loudspeakers are further configured to synchronously playback spatial audio.

In another additional embodiment, the reference device is further configured to obtain a second clock signal from an alternative clock signal source.

In a further additional embodiment, the clock signal and the second clock signal are multiplexed, and the synchronization signal is based upon the multiplexed signal.

In another embodiment again, the synchronization signal is based on the more stable of the clock signal and the second clock signal.

In a further embodiment again, a method for clock synchronization, including transmitting a synchronization signal based on a clock signal generated by a clock circuitry of a reference device, using a transmitter of the reference device receiving the synchronization signal at a receiving device, where the receiving device includes a processor, configured to operate by a general-purpose operating system (GPOS), a coprocessor, configured to operate by a real-time operating system (RTOS), and a memory utilized by the processor, where the coprocessor has direct memory access to the memory, and triggering an interrupt upon reception of the synchronization signal using the RTOS, sampling a GPOS clock time stored in the memory in response to the interrupt using the RTOS, generating a synchronized clock time based on the synchronization signal and the sampled GPOS clock time using the RTOS, and providing the GPOS with the synchronized clock time using the RTOS.

In still yet another embodiment, the processor and coprocessor are unique cores of a multicore processor.

In a still yet further embodiment, the method further includes playing back audio based on the synchronized clock time using a loudspeaker operatively connected to the receiving device using the GPOS.

In still another additional embodiment, the method further includes synchronizing the played back audio with a second audio playback by the reference device.

In a still further additional embodiment, the method further includes providing the GPOS with the synchronized clock time using a mailbox mechanism using the RTOS.

In still another embodiment again, the reference device includes a primary loudspeaker, and the receiving device includes a plurality of secondary loudspeakers.

In a still further embodiment again, the method further includes synchronously playing back spatial audio using the primary loudspeaker and the plurality of secondary loudspeakers.

In yet another additional embodiment, the method further includes obtaining a second clock signal from an alternative clock signal source using reference device.

In a yet further additional embodiment, the method further includes multiplexing the clock signal and the second clock signal, and the transmitted synchronization signal is based upon the multiplexed signal.

In yet another embodiment again, the synchronization signal is based on the more stable of the clock signal and the second clock signal.

Additional embodiments and features are set forth in part in the description that follows, and in part will become apparent to those skilled in the art upon examination of the specification or may be learned by the practice of the invention. A further understanding of the nature and advantages of the present invention may be realized by reference to the remaining portions of the specification and the drawings, which forms a part of this disclosure.

BRIEF DESCRIPTION OF THE DRAWINGS

The description and claims will be more fully understood with reference to the following figures and data graphs, which are presented as exemplary embodiments of the invention and should not be construed as a complete recitation of the scope of the invention.

DETAILED DESCRIPTION

Figure 1A:
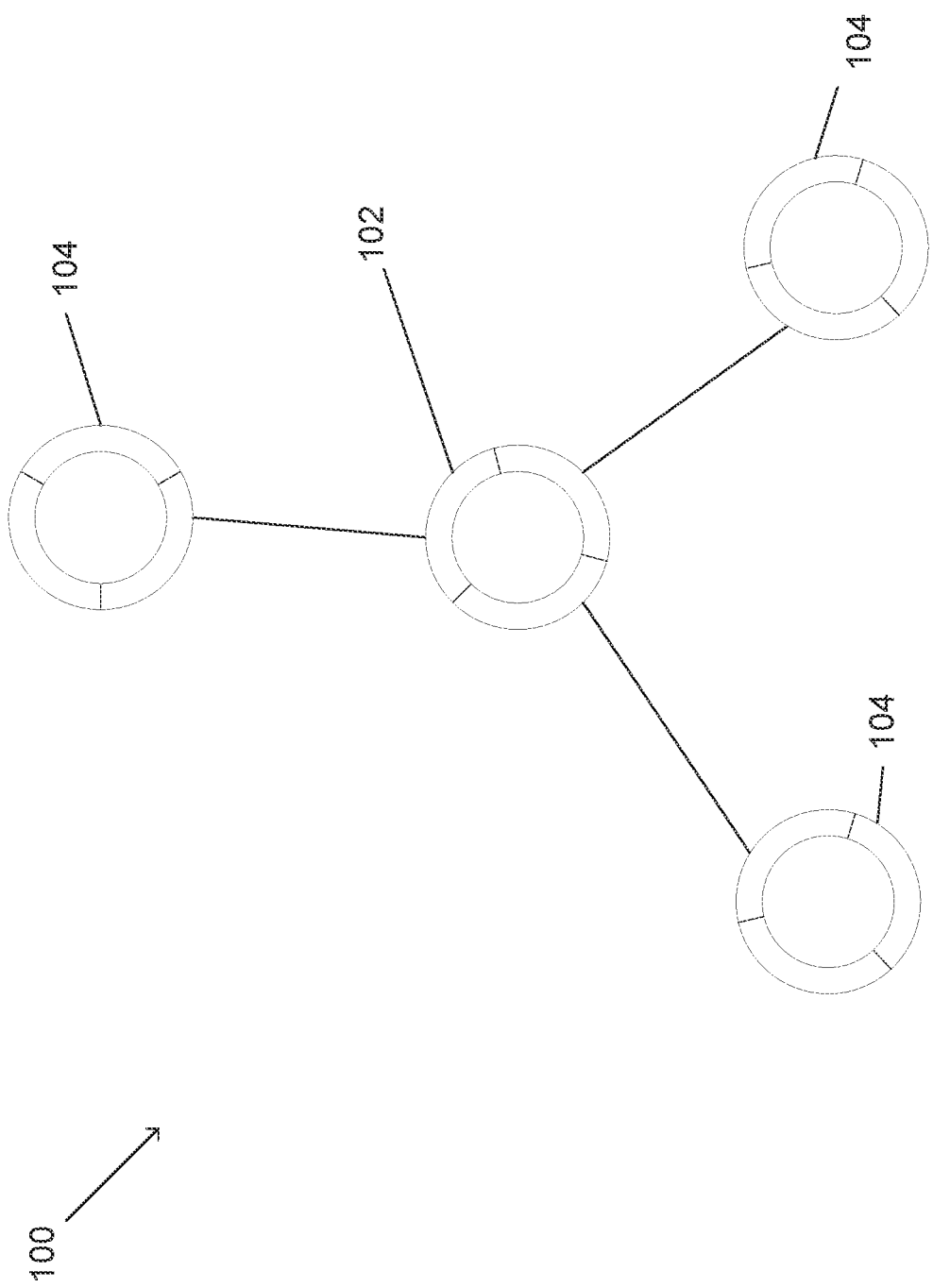
FIGS. 1A-C illustrates systems using heterogeneous clock synchronization in accordance with an embodiment of the invention.

Clock synchronization is an important focus of computer science and electrical engineering, especially in the context of distributed systems. For many different applications including (but not limited to) audio playback, robotics, network management, autonomous vehicles, and drone control systems, clock synchronization is a critical concern. For example, in the context of audio playback, if multiple networked loudspeakers are used to playback the same audio track (e.g. in a surround sound system), if the clocks on each loudspeaker are out of sync, the audio played back by each speaker will desynchronize, which can yield a poor listening experience. While any number of different audio systems can use systems and methods described herein for audio synchronization, an example spatial audio system that can utilize said systems and methods is discussed in U.S. patent application Ser. No. 16/839,021, titled "Systems and Methods for Spatial Audio Rendering" filed Apr. 2, 2020, the entirety of which is incorporated by reference. Similarly, for other applications, clock desynchronization can have unpleasant to disastrous effects depending on the technology.

Many attempts have been made to solve this problem. For example, the Network Time Protocol (NTP) was designed to synchronize participating computers to within a few milliseconds and is used in hundreds of millions of Internet connected devices. Many other synchronization protocols exist, such as (but not limited to) Global Positioning System (GPS) synchronization and the Precision Time Protocol (PTP). However, computing devices are often performing many tasks at once. Indeed, a benefit of a GPOS is its ability to schedule multiple tasks at once using a pool of shared resources. As such, even using high precision time protocols, a GPOS can introduce latency and clock skew by its nature. While RTOSs are capable of strict scheduling, they are generally purpose built and are inflexible, making them unsuitable for random requests by users.

Systems and methods described herein utilize a heterogeneous computing architecture to run both a GPOS and an RTOS. In many embodiments, the GPOS runs on a processor, and the RTOS runs on a coprocessor, where the coprocessor has direct memory access (DMA) to the processor's memory. The RTOS can be used to manage clock synchronization based on incoming clock signals immediately as they are received, and in response immediately read GPOS-utilized memory to access the GPOS clock for sampling using the RTOS DMA. The RTOS can then inject the synchronized clock value back into the GPOS. In many embodiments, this injection is performed using a mailbox mechanism. In this way, a system that has the flexibility of a GPOS system can be built with a much higher fidelity clock than conventional GPOS systems. In numerous embodiments, hardware can be incorporated to shorten the receive time of the signal at the receiver to the RTOS. For example, a general-purpose input/output (GPIO) pin can be used as a dedicated clock signal input from a receiver to immediately provide the signal.

Further, in many embodiments, systems and methods described herein can select the best available clock as a reference clock, and/or generate a synthetic reference clock based on available clocks. For example, in numerous embodiments, the alternating current (AC) utility frequency from the power line can be used as a reference clock signal based on location. Many countries have standardized, reliable utility frequencies (typically either 50 Hz or 60 Hz). In North America, the utility frequency is typically 60 Hz, whereas many European countries use 60 Hz. Other reference clock signals can be obtained from connected devices, an on-board clock, and/or any other received signal with a reliable frequency. Synthetic reference clocks can be generated by multiplexing reliable reference clock signals based on their reliability. Reference clock signals and synthetic reference clock signals can be used as synchronization signals and/or be used to generate synchronization signals which are provided to devices to be synchronized. Turning now to the drawings, heterogeneous clock synchronization systems and methods are described. A discussion of heterogeneous clock synchronization systems follows in the section below.

Heterogeneous Clock Synchronization Systems

Heterogeneous clock synchronization systems are computing systems where at least one component utilizes both a GPOS and an RTOS for clock synchronization. In some embodiments, the GPOS and RTOS functionality can be enabled using firmware or circuit level design, e.g. as an application-specific integrated circuit (ASIC), field-programmable gate array (FPGA), and/or any other system on chip (SoC) circuitry. Said systems have the advantage of having the flexibility of a GPOS without losing timing accuracy to scheduling. The high level of synchronization afforded by heterogeneous clock synchronization systems can be beneficial in any number of different applications, heterogeneous clock synchronization systems can be implemented using a number of different hardware architectures. Further, as can readily be appreciated, heterogeneous clock synchronization systems can be integrated into existing platforms what have circuitry which can support the hybrid OS and be modified to work with many existing timing algorithms. By way of example, as noted above, a high degree of clock synchronization is important for audio playback in distributed loudspeaker systems.

Wired speaker systems generally do not have clock components in the loudspeaker, and instead have a single amplifier which drives audio playback to connected speakers. It is generally recommended to have the wire lengths to each speaker be the same so that the signal takes the same amount of time to reach the loudspeaker from the amplifier, thereby yielding synchronous playback. In speaker systems with wireless speakers included, the distance between units may be unknown, and signal latency may be variable. The synchronized playback problem can be solved by synchronizing clocks in each of the wireless loudspeakers with at least the signal source. However, many conventional wireless loudspeaker systems use only a GPOS to orchestrate playback. Because many modern wireless loudspeakers can handle multiple tasks (e.g. voice assistants, user control input, app integration, etc.) on top of playback, scheduling using a GPOS can interfere with the precision required for clock synchronization. Heterogeneous clock synchronization systems can address this problem.

Turning now to FIG. 1A, a heterogeneous clock synchronization system in accordance with an embodiment of the invention is illustrated. System 100 includes a primary loudspeaker 102 and a number of secondary loudspeakers 104. The primary loudspeaker can contain a "reference" clock to which other clocks in the system are synchronized to. In many embodiments, the primary loudspeaker can be replaced with a reference device which does not function as a loudspeaker and therefore cannot in fact produce sound, but can still provide a synchronization signal. The primary loudspeaker sends a synchronization signal to each of the connected secondary loudspeakers. In many embodiments, each primary and secondary loudspeaker contains a heterogeneous computing architecture for running clock synchronization processes. These processes will be discussed in further detail in a section below. In numerous embodiments, the primary loudspeaker can further transmit audio data to the secondary loudspeakers for synchronous playback. The synchronization signal and audio data can be transmitted over the same channel or different channels depending on the configuration of the loudspeakers as appropriate to the requirements of specific applications of embodiments of the invention.

Figure 1B:
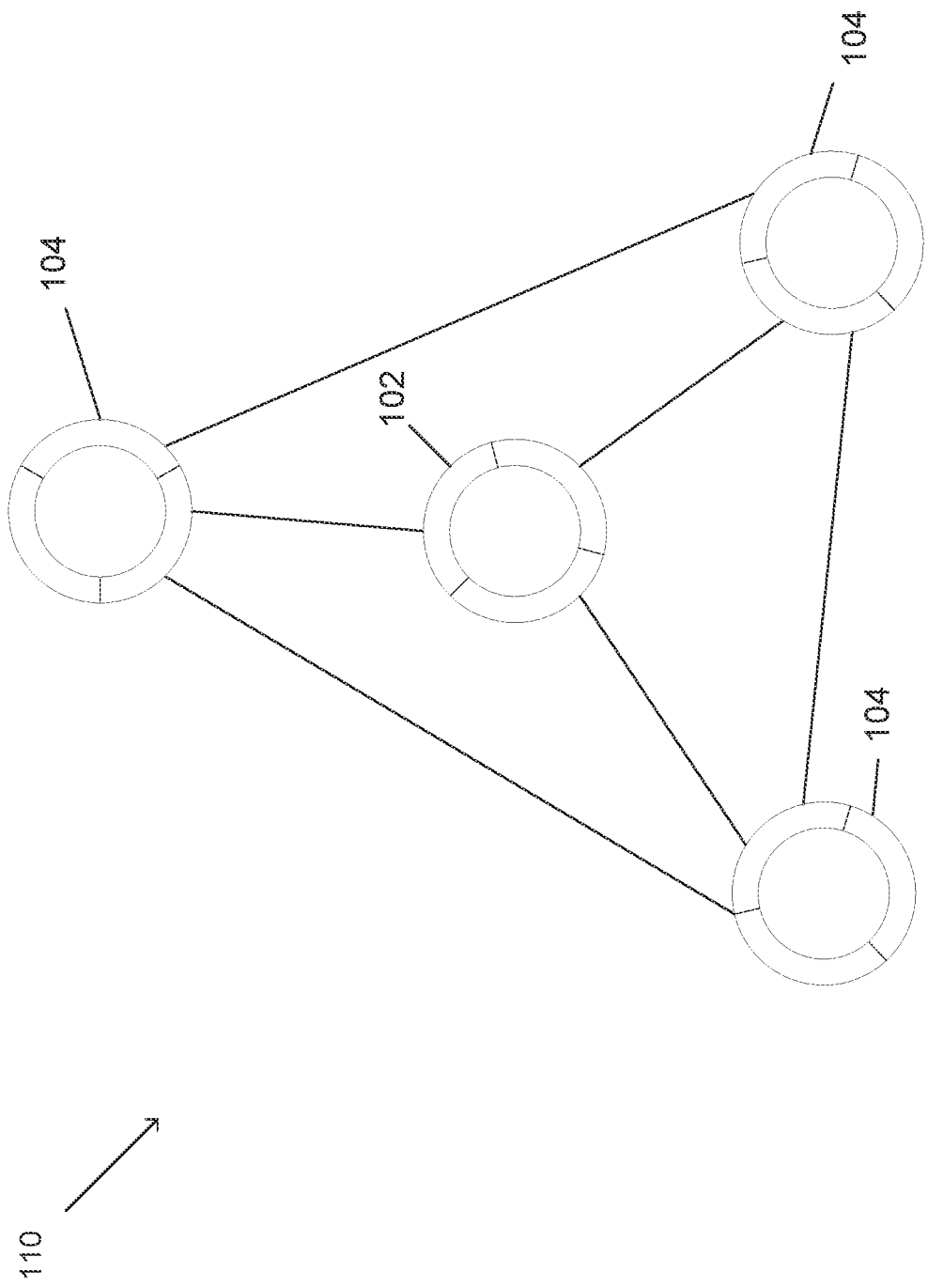
Figure 1C:
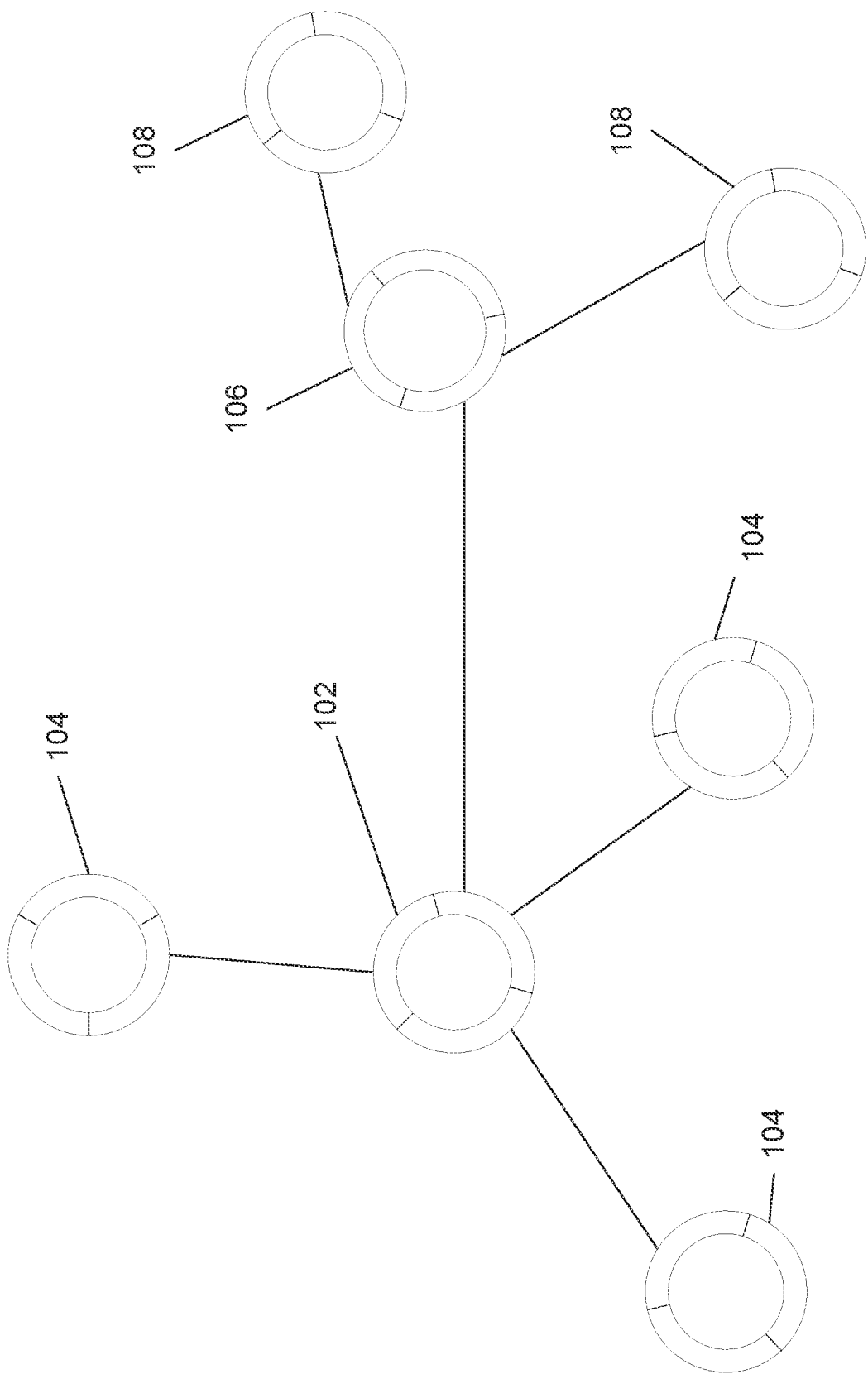

As can be readily appreciated, depending on the needs of the system, the loudspeakers can synchronize not only with the primary, but with each other, as illustrated in accordance with an embodiment of the invention in FIG. 1B. Further still, multiple different primary loudspeakers can be connected and share clock synchronization across multiple subnetworks as illustrated in accordance with an embodiment of the invention in FIG. 1C. In the illustrated embodiment, primary loudspeaker 102 can act as a "superprimary" loudspeaker and synchronize not only with its secondary loudspeakers 104, but also with primary loudspeaker 106, which in turn synchronizes its own secondary cells 108. Of course, one of ordinary skill in the art can appreciate that any number of devices can synchronize with any other connected device with any arbitrary hierarchy without departing from the scope or spirit of the invention.

Figure 2:
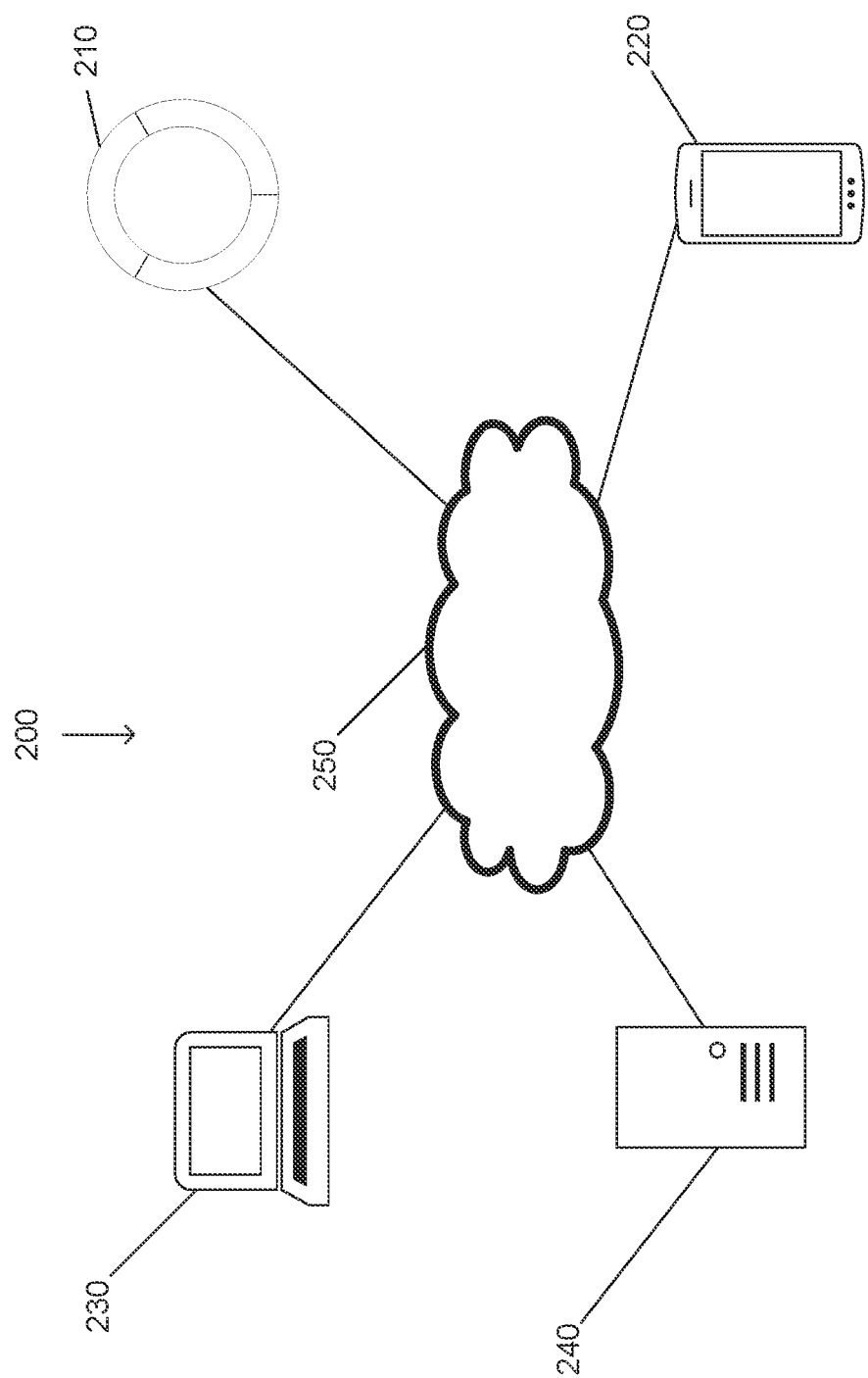
FIG. 2 illustrates a system using heterogeneous clock synchronization in accordance with an embodiment of the invention.

Indeed, loudspeakers are merely an example, and any number of different types of devices can both use and benefit from heterogeneous computing systems for clock synchronization. FIG. 2, for example, illustrates a system with multiple different types of connected devices using heterogeneous clock synchronization systems in accordance with an embodiment of the invention. System 200 includes loudspeakers 210, smartphones 220, computers 230, and servers 240, all of which are connected via a network 250. This is not to be understood as an exhaustive list of all devices which can use heterogeneous clock synchronization systems, and any number of devices can be constructed to include heterogeneous clock synchronization systems. Specific hardware architectures for heterogeneous clock synchronization systems are discussed further below.

Heterogeneous Clock Synchronization System Architectures

Heterogeneous clock synchronization systems can utilize both a GPOS and a RTOS to synchronize clocks. GPOS are highly flexible and therefore are excellent at performing all sorts of desirable tasks (e.g. audio playback and other functionality of a loudspeaker), but as a result can suffer from clock synchronization problems due to scheduling of synchronization processes. If the clock synchronization process is forced to wait until a different process is finished with execution on the processor, lag is introduced to the timing. Even when synchronization is given priority, other critical processes such as (but not limited to) kernel calls can take precedence or otherwise impede immediate access to the processor. In contrast, RTOS can include an interrupt which immediately passes control of the processor to the interrupt task. This means that the RTOS can be used to handle processing of the clock synchronization signal immediately, and by giving the RTOS direct memory access (DMA) to the GPOS memory, the GPOS clock can be immediately read and sampled to produce a synchronized clock time. However, RTOS scheduling paradigms make many desirable applications infeasible or inefficient, because (for example) most many real-time scheduling algorithms (i.e. rate monotonic) gain deterministic deadlines at the expense of performance with varying workloads. By handling synchronization using RTOS and general system functions using a GPOS, a heterogeneous clock synchronization system architecture can give a significant boost to synchronization fidelity to arbitrary purpose computing devices.

Figure 3:
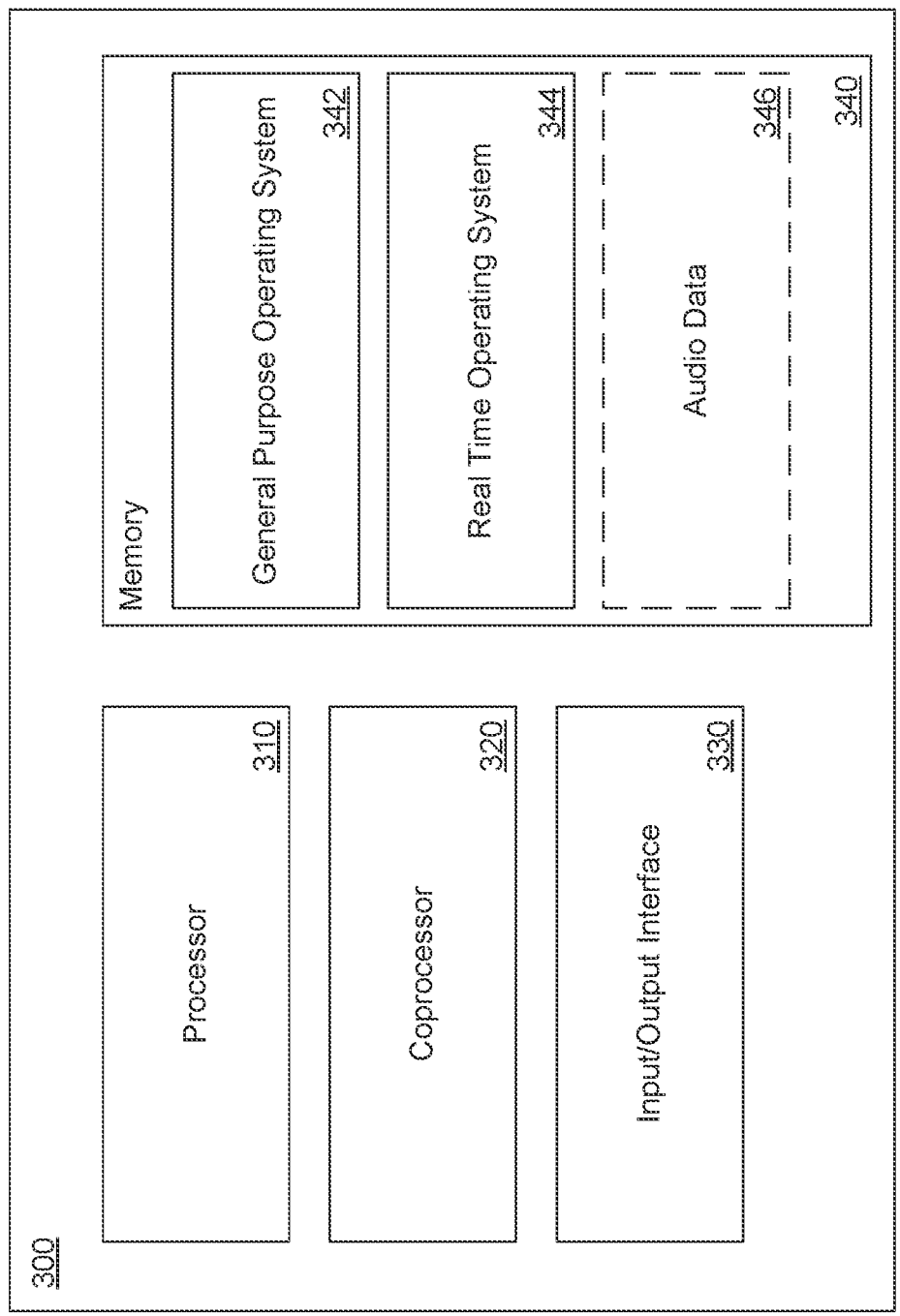
FIG. 3 is a block diagram for a device using a heterogeneous clock synchronization system in accordance with an embodiment of the invention.

Turning now to FIG. 3, an architecture for enabling heterogeneous clock synchronization in accordance with an embodiment of the invention is illustrated. The device 300 includes a processor 310 and a coprocessor 320. In many embodiments, the processor is used by the GPOS and the coprocessor is used by the RTOS. The device further includes an input/output (I/O) interface 330. The I/O interface can be made of multiple different I/O components (e.g. pins, transmitters, receivers, transceivers, ports, wires, etc.) The I/O interface can be used to transmit data, for example audio data in the context of at least loudspeakers. However, in numerous embodiments the I/O interface includes at least one general-purpose I/O (GPIO) pin. The GPIO pin can be connected to a receiver which obtains a synchronization signal and be used to immediately trigger an interrupt in the RTOS. However, the interrupt can be triggered using any of a number of different methods and/or over signals from a number of different I/O components. In various embodiments, the I/O interface is capable of receiving electrical power and measuring the utility frequency of the AC. In many embodiments, the I/O interface can be used by a device to transmit a synchronization signal to other devices. For example, a primary loudspeaker may transmit a reference synchronization signal to secondary loudspeakers via a wireless and/or wired channel.

Figure 4:
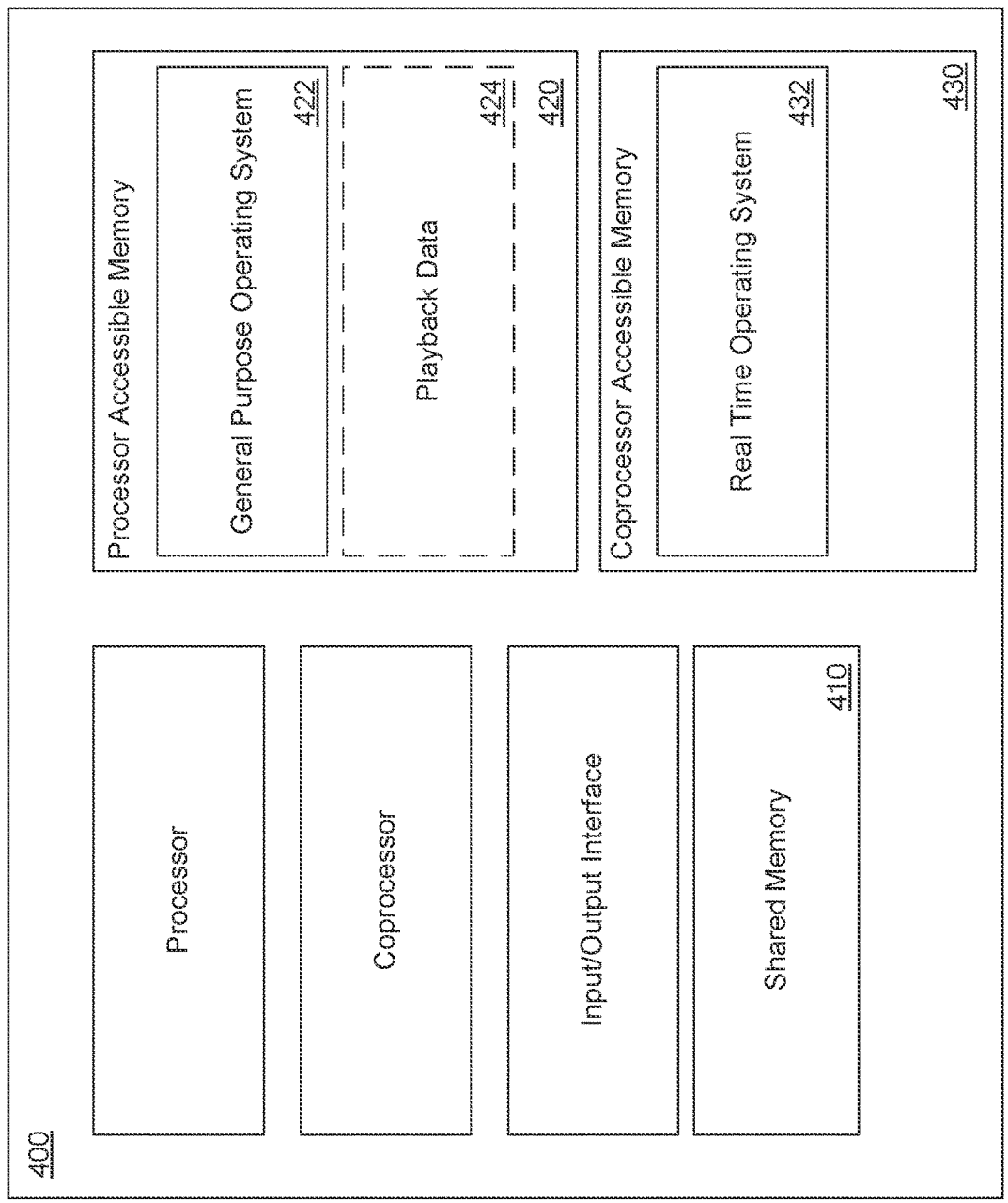
FIG. 4 is a block diagram for another device using a heterogeneous clock synchronization system in accordance with an embodiment of the invention.

The device 300 further includes a memory 340 which stores the GPOS 342, and the RTOS 344. In many embodiments, depending on the use case, the memory 340 can also store audio data 346 to be synchronously played back. As the RTOS has DMA to the memory of the GPOS, it can immediately provide synchronization data. However, any number of different memory configurations can be used as appropriate to the requirements of specific applications of embodiments of the invention. For example, FIG. 4 illustrates a similar device instead having a shared memory 410 and a separate independent memory for the processor 420 and a separate independent memory for the coprocessor 430. The processor accessible memory can contain the GPOS 422 and any playback data 424, where the coprocessor accessible memory can contain the RTOS 430.

Figure 5:
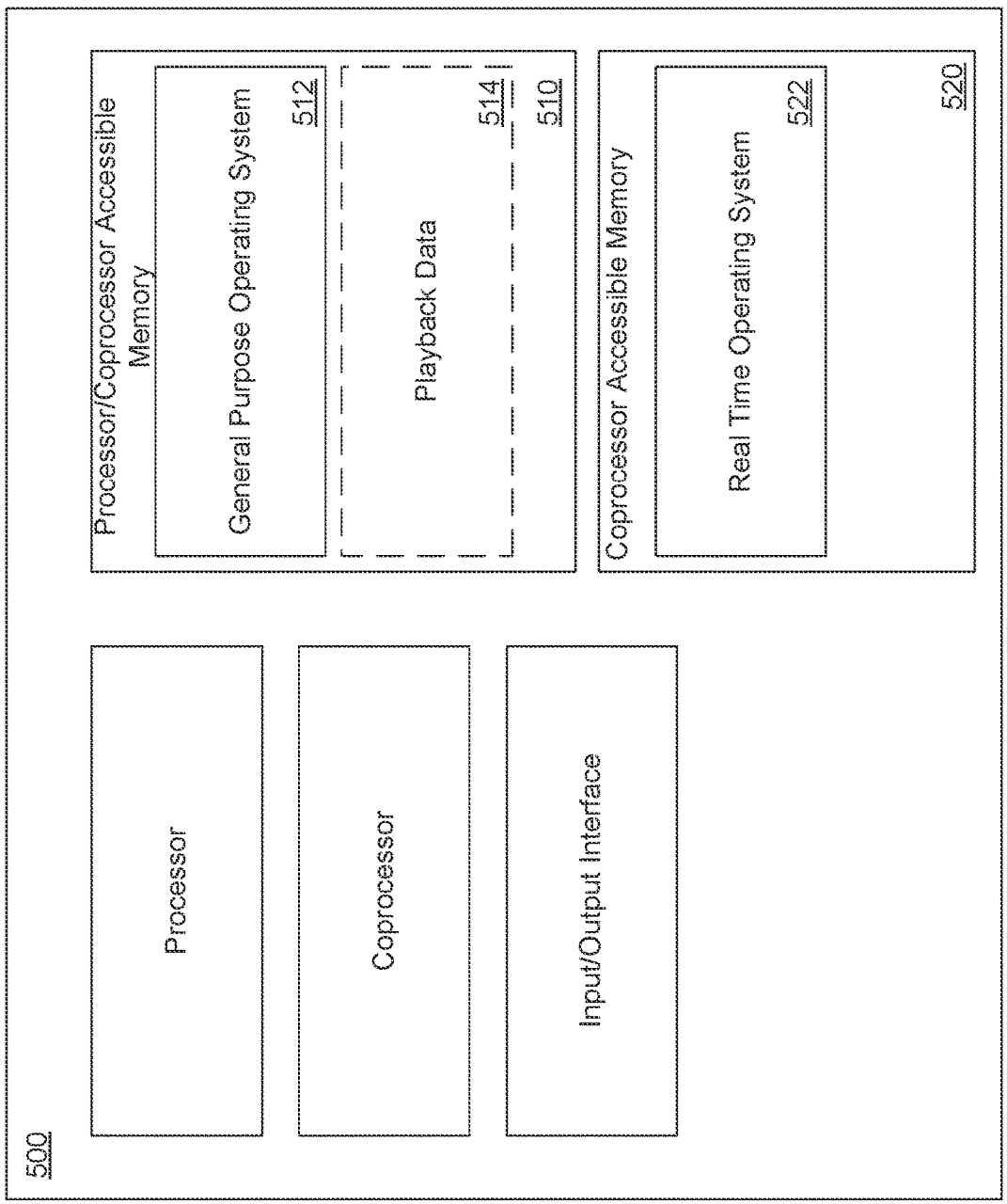
FIG. 5 is a block diagram for yet another a device using a heterogeneous clock synchronization system in accordance with an embodiment of the invention.

By way of further example, FIG. 5 illustrates a similar device where a memory for the processor 510 contains the GPOS 512 and any playback data 514 where applicable. The coprocessor has its own memory 520 which contains the RTOS 522, but the coprocessor has further DMA to the processor's memory 510. While various architectures are discussed above with respect to FIGS. 3-5, as can be readily appreciated, any number of different architectures that can support cooperation of a GPOS and an RTOS can be used without departing from the scope or spirit of the invention. Different memory layouts including those with more memory or different memory allocations can be used as appropriate to the requirements of specific applications of embodiments of the invention. In many embodiments, memory includes both volatile and non-volatile components as part of an overall memory solution. Indeed, certain architectures can implement both an RTOS and a GPOS on different cores of a single, multi-core processor. In numerous embodiments, at least the RTOS functionality can be implemented as firmware or as part of a physical logic circuit such as, but not limited to, an field-programmable gate array (FPGA), application-specific integrated circuit (ASIC) and/or any form of system on chip (SoC). Processes for heterogeneous clock synchronization are discussed further below.

Heterogeneous Clock Synchronization Processes

Heterogeneous clock synchronization can be very useful for any application which requires low-error clock synchronization. At a high level, heterogeneous clock synchronization involves capturing a synchronization signal and using an RTOS to quickly and accurately record the receipt and inject data necessary for the overarching process to synchronize directly to the memory used by the GPOS and any child processes. In many cases, this is a mere timestamp. In some cases, it can be more complex depending on the application and/or the data contained in the synchronization signal. While the below provides examples in the context of audio playback for the benefit of understanding, as can be readily appreciated, any number of modifications can simply be made to address the requirements of specific applications of embodiments of the invention.

Figure 6:
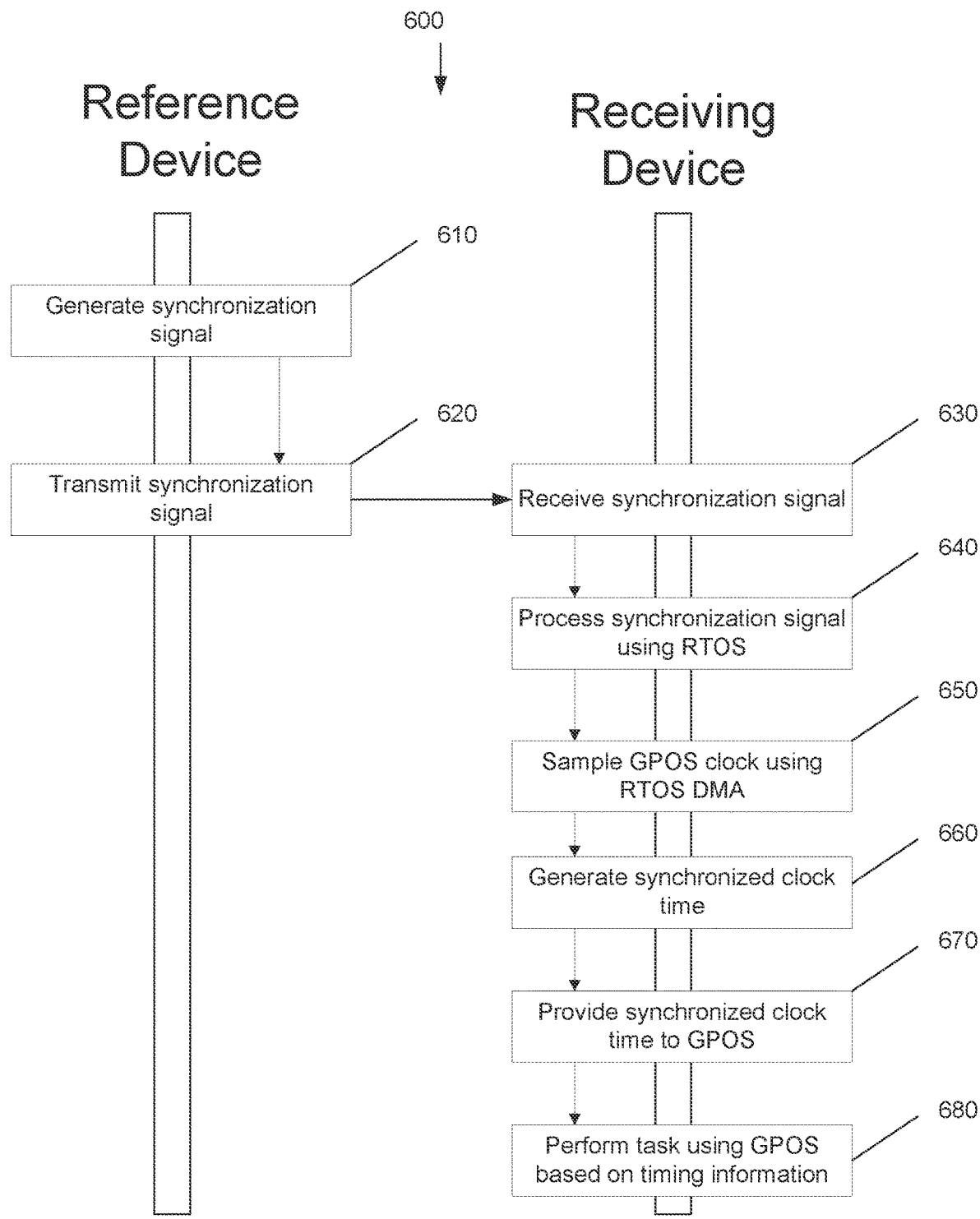
FIG. 6 is a communication diagram for a heterogeneous clock synchronization process in accordance with an embodiment of the invention.

Turning now to FIG. 6, a communication diagram for a heterogeneous clock synchronization process in accordance with an embodiment of the invention is illustrated. Communication flow 600 includes a reference device generating a synchronization signal 610 and transmitting (620) the synchronization signal. In many embodiments, there reference device is a primary loudspeaker. However, the reference device can be any number of devices including (but not limited to), the power grid, a media playback device, a clock circuit, and/or any other device capable of producing a clock signal. The synchronization signal is received (630) at a receiver of a receiving device which processes (640) the synchronization signal using an RTOS. The RTOS samples (650) the GPOS clock using DMA and generates (660) a synchronized clock time based on the sampled GPOS clock and the synchronization signal. The synchronized clock time is provided (670) to the GPOS, and the GPOS uses the timing information to perform (680) its task in a synchronized manner with based on the timing information.

Figure 7:
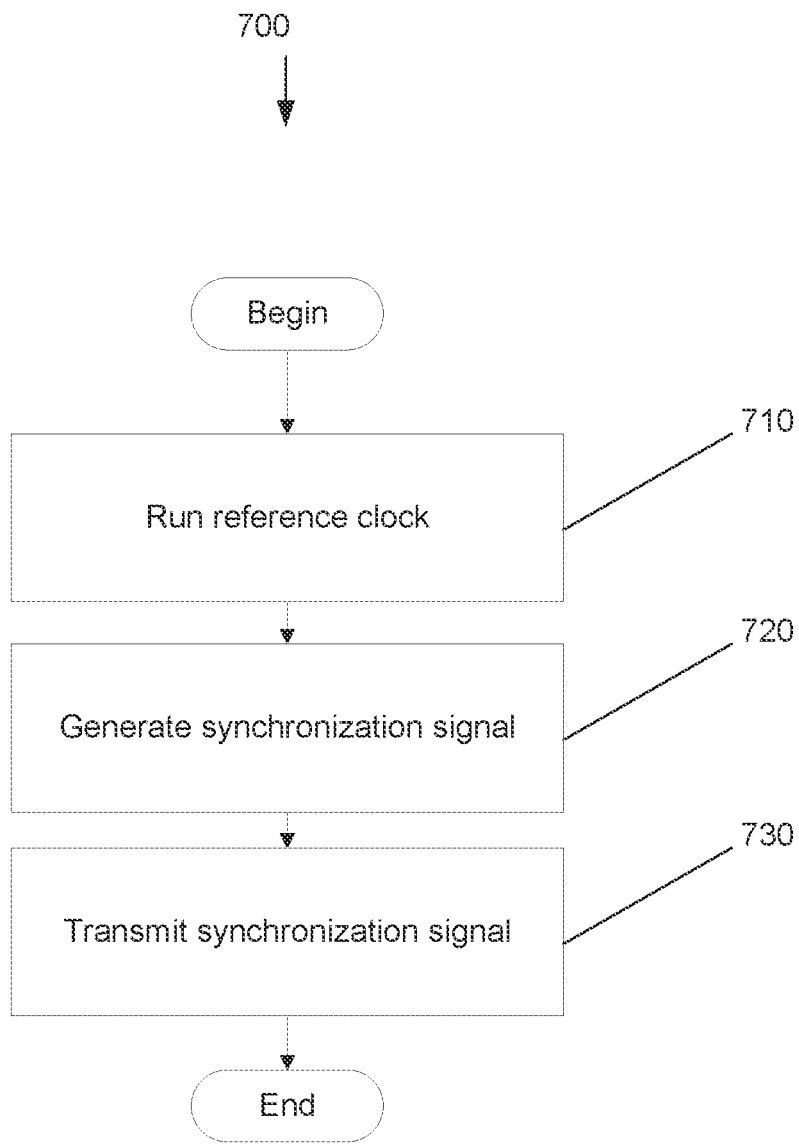
FIG. 7 is a flow chart for transmission of a synchronization signal in a heterogeneous clock synchronization process in accordance with an embodiment of the invention.

Transmission of the synchronization signal is further illustrated in accordance with an embodiment of the invention in FIG. 7. A reference clock is run at the reference device. The reference clock is the clock timing to which other clocks in the system are synchronized. A synchronization signal is then generated (720). In many embodiments, the synchronization signal is a timestamp obtained from an on-board clock and/or a counter. In various embodiments, the synchronization signal encodes the originating device. In some embodiments, the synchronization signal at a known frequency. However, synchronization signals can be encoded with additional data as appropriate to the requirements of specific applications of embodiments of the invention. The synchronization signal is then transmitted (730). In many embodiments, the synchronization signal is transmitted over a wireless channel using a radio frequency transmitter. However, other transmission channels such as (but not limited to) magnetic transmission channels, optical transmission channels and/or any other channel as appropriate to the requirements of specific applications of embodiments of the invention can be used.

Figure 8:
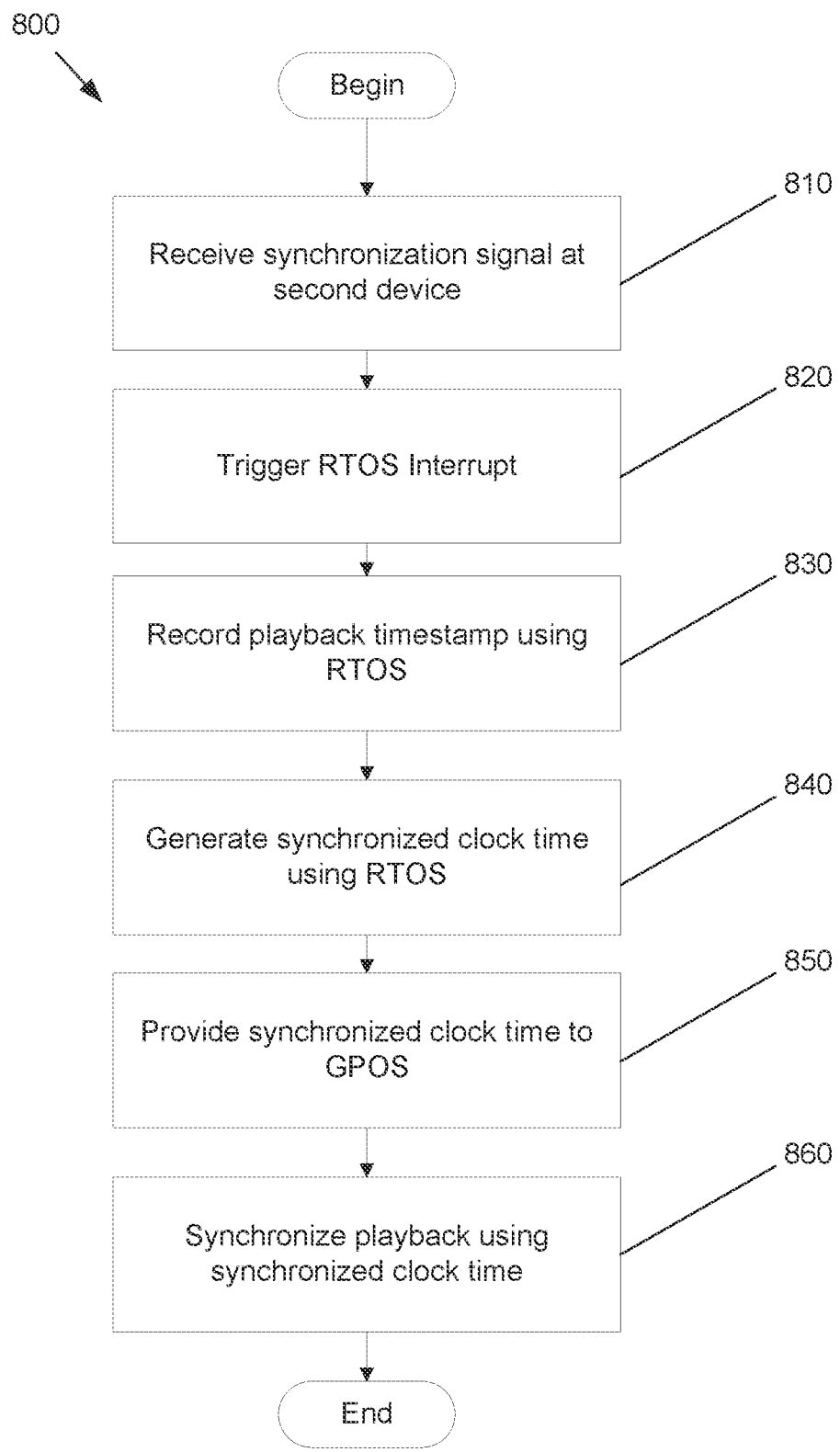
FIG. 8 is a flow chart for clock synchronization using a received synchronization signal in a heterogeneous clock synchronization process in accordance with an embodiment of the invention.

Turning now to FIG. 8, a flow chart for synchronizing a clock using a received synchronization signal in a heterogeneous clock synchronization process in accordance with an embodiment of the invention is illustrated. Process 800 includes receiving (810) the synchronization signal. Reception of the signal triggers (820) an interrupt in the RTOS. In various embodiments, the signal is received via a GPIO pin directly connected to a coprocessor running the RTOS. A playback timestamp is obtained (830) using the RTOS indicating how many audio samples have been played back. In many embodiments, the RTOS provides no other functionality in order to minimize the number of other tasks it must perform which can increase its response time to the signal reception. The RTOS generates (840) a synchronized clock time based on the playback timestamp (and/or clock time as appropriate to the requirements of specific applications of embodiments of the invention) and provides (850) the synchronized clock time to the GPOS. In many embodiments, the synchronized clock time is provided to the GPOS via a mailbox mechanism, although any number of different data transfer methods can be utilized as appropriate to the requirements of specific applications of embodiments of the invention. The GPOS synchronizes (860) the playback based on the synchronized clock time.

As noted above, in many embodiments, the synchronization signal is produced by a reference device. However, the synchronization signal can be selected from any of a number of available clock signals. For example, while reference device may generate its own clock signal using clock circuitry, it may also receive alternative clock signals from alternative clock signal sources such as (but not limited to) the utility frequency of the electrical power being supplied, via the internet from a time server, from GPS satellites, and/or any other clock signal sources. In many embodiments, the reference device can select the most reliable clock signal.

Figure 9:
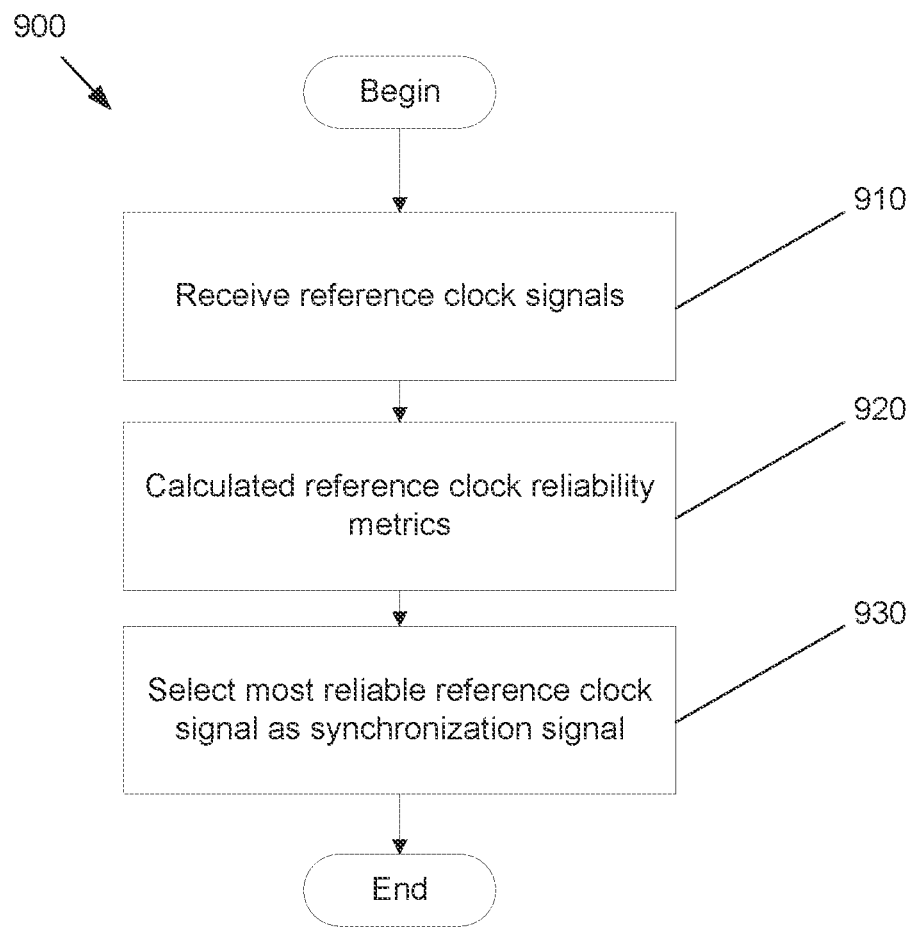
FIG. 9 is a flow chart for selecting a synchronization signal in accordance with an embodiment of the invention.

Turning now to FIG. 9, a process for selecting a synchronization signal in accordance with an embodiment of the invention is illustrated. Process 900 includes receiving (910) reference clock signals such as (but not limited to) those described above. Reliability metrics can be calculated (920) describing the reliability with which a reference clock signal maintains a consistent frequency (and/or frequency pattern). In various embodiments, the most reliable source clock signal is selected (930) as the synchronization signal. However, in numerous embodiments, a synthetic reference clock signal can be generated.

Figure 10:
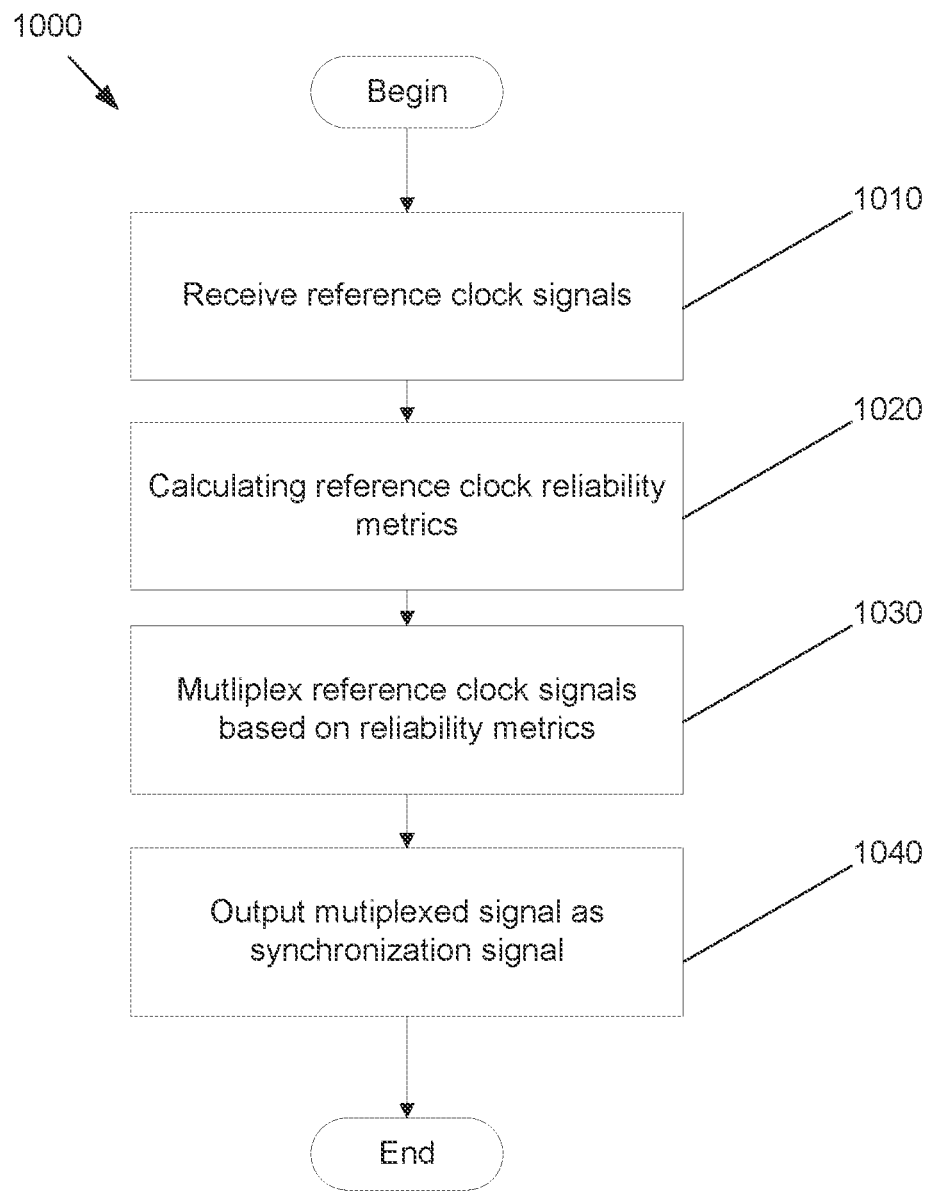
FIG. 10 is a flow chart for generating a synchronization signal based on a synthetic reference clock signal in accordance with an embodiment of the invention.

Turning now to FIG. 10, a process for generating a synthetic reference clock signal for use as a synchronization signal in accordance with an embodiment of the invention is generated. Process 1000 includes receiving (1010) reference clock signals and calculating (1020) reliability metrics. The various reference clock signals can then be multiplexed based on the reliability metrics. For example, in a variety of embodiments, each reference clock signal is weighted based on their reliability metric and multiplexed using the weighted signals. However, other multiplexing methods can be used as appropriate to the requirements of specific applications of embodiments of the invention. In numerous embodiments, only reference clock signals with reliability metrics above a reliability threshold value are multiplexed. The multiplexed signal can be output (1040) as the synchronization signal.

In various embodiments, devices to be synchronized can negotiate a reliable set of one or more reference clock signals to use in synchronization. In various embodiments, this can result in situations where all devices are using, for example, the utility frequency and therefore obtain at least a portion of the reference clock signals from the power grid, rather from another local device. However, any number of different signals and weights can be used based on the operating environment and/or available reference clock signals as appropriate to the requirements of specific applications of embodiments of the invention.

Although specific systems and methods for heterogeneous clock synchronization are discussed above, many different fabrication methods can be implemented in accordance with many different embodiments of the invention. It is therefore to be understood that the present invention may be practiced in ways other than specifically described, without departing from the scope and spirit of the present invention. Thus, embodiments of the present invention should be considered in all respects as illustrative and not restrictive. Accordingly, the scope of the invention should be determined not by the embodiments illustrated, but by the appended claims and their equivalents.

What is claimed is:

1. A heterogeneous clock synchronization system, comprising:
    a reference device comprising:
        a clock circuitry; and
        a transmitter;
        where the transmitter is configured to transmit a synchronization signal based on a clock signal generated by the clock circuitry; and
    at least one receiving device comprising:
        a processor, directed by a general-purpose operating system (GPOS);
        a coprocessor, directed by a real-time operating system (RTOS);
        a memory accessible by the processor and the coprocessor; and
        a receiver;
        where the RTOS directs the coprocessor to:
            trigger an interrupt upon reception, by the receiving device using the receiver, of the synchronization signal;
            sample a GPOS clock time stored in the memory in response to the interrupt;
            generate a synchronized clock time based on the synchronization signal and the sampled GPOS clock time, where the synchronized clock time is synchronized to the clock signal of the reference device; and
            store the synchronized clock time in the memory.

2. The heterogeneous clock synchronization system of claim 1, wherein the processor and coprocessor are unique cores of a multicore processor.

3. The heterogeneous clock synchronization system of claim 1, wherein the GPOS configures the processor to playback audio based on the synchronized clock time using a playback device operatively connected to the receiving device.

4. The heterogeneous clock synchronization system of claim 3, wherein the audio playback by the receiving device is synchronized with audio playback by the reference device.

5. The heterogeneous clock synchronization system of claim 1, wherein to store the synchronized clock time memory, the RTOS directs the coprocessor to store the synchronized clock time in a mailbox location of the memory accessible by the GPOS.

6. The heterogeneous clock synchronization system of claim 1, wherein the reference device comprises a primary playback device; and the at least one receiving device comprises at least one secondary playback device.

7. The heterogenous clock synchronization system of claim 6, wherein the primary playback device and the at least one secondary playback device is further configured to synchronously playback audio using the clock signal and the synchronized clock time, respectively.

8. The heterogenous clock synchronization system of claim 1, where the reference device is further configured to obtain a second clock signal from an alternative clock signal source.

9. The heterogenous clock synchronization system of claim 8, wherein the reference device is further configured to:
    multiplex the clock signal and the second clock signal; and generate the synchronization signal based upon the multiplexed signal.

10. The heterogenous clock synchronization system of claim 8, wherein the synchronization signal is based upon the more stable of the clock signal and the second clock signal.

11. A method for clock synchronization, comprising:
transmitting, using a transmitter of a reference device, a synchronization signal based on a clock signal generated by a clock circuitry of the reference device,:
receiving, using a receiver of a receiving device, the synchronization signal triggering an interrupt, using a coprocessor directed by a real time operating system (RTOS), upon reception of the synchronization signal;
sampling, using the coprocessor, a clock time stored in a memory in response to the interrupt, where:
the clock time is used by a general purpose operating system (GPOS);
the GPOS directs a processor; and
the memory is accessible by the processor and the coprocessor;
generating, using the coprocessor, a synchronized clock time based on the synchronization signal and the sampled clock time; and
storing the synchronized clock time in the memory using the coprocessor.

12. The method for clock synchronization of claim 11, wherein the processor and coprocessor are unique cores of a multicore processor.

13. The method for clock synchronization of claim 11, further comprising playing back audio based on the synchronized clock time using a playback device operatively connected to the receiving device using the GPOS.

14. The method for clock synchronization of claim 13, further comprising synchronizing the played back audio with a second audio playback by the reference device.

15. The method for clock synchronization of claim 11, wherein storing the synchronized clock time in the memory comprises storing the synchronized clock signal in a mailbox location of the memory accessible by the GPOS.

16. The method for clock synchronization of claim 11, wherein the reference device comprises a primary playback device; and the at least one receiving device comprises at least one secondary playback device.

17. The method for clock synchronization of claim 16, further comprising synchronously playing back audio using the primary playback device and the at least one secondary playback device using the clock signal and the synchronized clock time, respectively.

18. The method for clock synchronization of claim 11, further comprising obtaining a second clock signal from an alternative clock signal source using reference device.

19. The method for clock synchronization of claim 18, further comprising:
multiplexing the clock signal and the second clock signal; and
generating the synchronization signal based upon the multiplexed signal.

20. The method for clock synchronization of claim 18, wherein the synchronization signal is based upon the more stable of the clock signal and the second clock signal.

* * * * *